United States Patent
Aberman et al.

(10) Patent No.: US 12,555,275 B2
(45) Date of Patent: Feb. 17, 2026

(54) PERSONALIZED TEXT-TO-IMAGE DIFFUSION MODEL

(71) Applicant: Google LLC, Mountain View, CA (US)

(72) Inventors: Kfir Aberman, San Mateo, CA (US); Nataniel Ruiz Gutierrez, Brookline, MA (US); Michael Rubinstein, Natick, MA (US); Yuanzhen Li, Newton Centre, CA (US); Yael Pritch Knaan, Tel Aviv (IL); Varun Jampani, Rockland, MA (US)

(73) Assignee: Google LLC, Mountain View, CA (US)

( * ) Notice: Subject to any disclaimer, the term of this patent is extended or adjusted under 35 U.S.C. 154(b) by 87 days.

(21) Appl. No.: 18/569,844

(22) PCT Filed: Aug. 23, 2023

(86) PCT No.: PCT/US2023/030938
§ 371 (c)(1),
(2) Date: Dec. 13, 2023

(87) PCT Pub. No.: WO2024/044258
PCT Pub. Date: Feb. 29, 2024

(65) Prior Publication Data
US 2024/0296596 A1    Sep. 5, 2024

Related U.S. Application Data

(60) Provisional application No. 63/400,368, filed on Aug. 23, 2022.

(51) Int. Cl.
*G06T 11/00* (2006.01)
*G06V 10/764* (2022.01)

(52) U.S. Cl.
CPC ............ *G06T 11/00* (2013.01); *G06V 10/764* (2022.01); *G06V 2201/07* (2022.01)

(58) Field of Classification Search
CPC ... G06T 11/00; G06V 10/764; G06V 2201/07
See application file for complete search history.

(56) References Cited

U.S. PATENT DOCUMENTS

| | | | |
|---|---|---|---|
| 2016/0210367 A1* | 7/2016 | Yamada | G06Q 30/0201 |
| 2021/0141861 A1* | 5/2021 | Kalluri | G06F 40/284 |
| 2021/0342377 A1* | 11/2021 | Galle | G06F 40/58 |

(Continued)

OTHER PUBLICATIONS

Rombach, Robin, et al. "High-resolution image synthesis with latent diffusion models." Proceedings of the IEEE/CVF conference on computer vision and pattern recognition. 2022. (Year: 2022).*

(Continued)

*Primary Examiner* — Yu Chen
(74) *Attorney, Agent, or Firm* — Fish & Richardson P.C.

(57) ABSTRACT

Methods, systems, and apparatus, including computer programs encoded on computer storage media, for training a text-to-image model so that the text-to-image model generates images that each depict a variable instance of an object class when the object class without the unique identifier is provided as a text input, and that generates images that each depict a same subject instance of the object class when the unique identifier is provided as the text input.

20 Claims, 5 Drawing Sheets

(56) References Cited

U.S. PATENT DOCUMENTS

2022/0253871 A1* 8/2022 Miller .................... G06F 16/36

OTHER PUBLICATIONS

Gal, Rinon, et al. ("An image is worth one word: Personalizing text-to-image generation using textual inversion." arXiv preprint arXiv:2208.01618 (Aug. 2, 2022).) (Year: 2022).*

Kudo, Taku, and John Richardson. ("Sentencepiece: A simple and language independent subword tokenizer and detokenizer for neural text processing." arXiv preprint arXiv:1808.06226 (2018).). (Year: 2018).*

Abdal et al., "CLIP2StyleGAN: Unsupervised Extraction of StyleGAN Edit Directions," CoRR, Submitted on Dec. 9, 2021, arXiv:2112.05219v1, pp. 1-17.

Avrahami et al., "Blended Diffusion for Text-driven Editing of Natural Images," Paper, Presented at the Computer Vision and Pattern Recognition, New Orleans, LA, Jun. 18-24, 2022; Proceedings of the Conference on Computer Vision and Pattern Recognition, Jan. 2023, pp. 18208-18218.

Avrahami et al., "Blended latent diffusion," CoRR, Submitted on Jun. 6, 2022, arXiv:2206.02779v1, pp. 1-20.

Bar-Tal et al., "Text2LIVE: Text-Driven Layered Image and Video Editing," CoRR, Submitted on Apr. 5, 2022, arXiv:2204.02491v1, pp. 1-21.

Bar-Tal et al., "Text2LIVE: Text-Driven Layered Image and Video Editing," CoRR, Submitted on May 25, 2022, arXiv:2204.02491v2, pp. 1-21.

Bau et al., "Paint by Word," CoRR, Submitted on Mar. 19, 2021, arXiv:2103.10951v1, 10 pages.

Bau et al., "Paint by Word," CoRR, Submitted on Mar. 24, 2021, arXiv:2103.10951v2, 10 pages.

Brock et al., "Large Scale GAN Training for High Fidelity Natural Image Synthesis," CoRR, Submitted on Sep. 28, 2018, arXiv:1809.11096v1, pp. 1-29.

Cho et al., "DALL-Eval: Probing the Reasoning Skills and Social Biases of Text-to-Image Generative Transformers," CoRR, Submitted on Feb. 8, 2022, arXiv:2202.04053v1, pp. 1-20.

Choi et al., "ILVR: Conditioning Method for Denoising Diffusion Probabilistic Models," CoRR, Submitted on Aug. 6, 2021, arXiv:2108.02938v1, 14 pages.

Choi et al., "ILVR: Conditioning Method for Denoising Diffusion Probabilistic Models," CoRR, Submitted on Sep. 15, 2021, arXiv:2108.02938v2, 14 pages.

Crowson et al., "VQGAN-CLIP: Open Domain Image Generation and Editing with Natural Language Guidance," CoRR, Submitted on Apr. 18, 2022, arXiv:2204.08583v1, pp. 1-31.

Crowson et al., "VQGAN-CLIP: Open Domain Image Generation and Editing with Natural Language Guidance," CoRR, Submitted on Sep. 4, 2022, arXiv:2204.08583v2, pp. 1-32.

Dhariwal et al., "Diffusion models beat GANs on image synthesis," Paper, Presented at the 35th Conference on Neural Information Processing Systems, Virtual Event, Dec. 6-14, 2021; Advances in Neural Information Processing Systems 34, May 2022, pp. 1-15.

Ding et al., "CogView: Mastering Text-to-Image Generation via Transformers," Paper, Presented at the 35th Conference on Neural Information Processing Systems, Virtual Event, Dec. 6-14, 2021; Advances in Neural Information Processing Systems 34, May 2022, pp. 1-14.

Esser et al., "Taming Transformers for High-Resolution Image Synthesis," Paper, Presented at the conference on computer vision and pattern recognition, Nashville, TN, Jun. 20-25, 2021; Proceedings of the conference on computer vision and pattern recognition, Dec. 2021, pp. 12873-12883.

Gafni et al., "Make-A-Scene: Scene-Based Text-to-Image Generation with Human Priors," CoRR, Submitted on Mar. 24, 2022, arXiv:2203.13131v1, pp. 1-17.

Gal et al., "An Image is Worth One Word: Personalizing Text-to-Image Generation using Textual Inversion," CoRR, Submitted on Aug. 2, 2022, arXiv:2208.01618v1, pp. 1-26.

Gal et al., "StyleGAN-NADA: CLIP-Guided Domain Adaptation of Image Generators," CoRR, Submitted on Aug. 2, 2021, arXiv:2108.00946v1, pp. 1-19.

Gal et al., "StyleGAN-NADA: CLIP-Guided Domain Adaptation of Image Generators," CoRR, Submitted on Dec. 16, 2021, arXiv:2108.00946v2, pp. 1-25.

Goodfellow et al., "Generative adversarial nets," Paper, Presented at the 28th Conference on Neural Information Processing Systems, Montreal, Canada, Dec. 8-13, 2014; Advances in Neural Information Processing Systems 27, Jun. 2015, pp. 1-9.

Hinz et al., "Semantic object accuracy for generative text-to-image synthesis," IEEE transactions on pattern analysis and machine intelligence, Mar. 2022, 44(3):1-14.

Ho et al., "Cascaded diffusion models for high fidelity image generation," Journal of Machine Learning Research, Jan. 2022, 23:1-33, 47.

Ho et al., "Denoising Diffusion Probabilistic Models," CoRR, Submitted on Dec. 16, 2020, arXiv:2006.11239v2, pp. 1-25.

Ho et al., "Denoising diffusion probabilistic models," Paper, Presented at the 34th Conference on Neural Information Processing Systems, Virtual Event, Dec. 6-12, 2020; Advances in Neural Information Processing Systems 33, Jul. 2021, pp. 1-12.

International Search Report and Written Opinion in International Appln. No. PCT/US2023/030938, mailed on Nov. 3, 2023, 18 pages.

Karras et al., "A Style-Based Generator Architecture for Generative Adversarial Networks," Paper, Presented at the conference on computer vision and pattern recognition, Long Beach, CA, Jun. 15-20, 2019; Proceedings of the Conference on Computer Vision and Pattern Recognition, Feb. 2020, pp. 4401-4410.

Karras et al., "Alias-free generative adversarial networks," Paper, Presented at the 35th Conference on Neural Information Processing Systems, Virtual Event, Dec. 6-14, 2021; Advances in Neural Information Processing Systems 34, May 2022, pp. 1-12.

Karras et al., "Analyzing and Improving the Image Quality of StyleGAN," Paper, Presented at the Conference on Computer Vision and Pattern Recognition, Seattle, WA, Jun. 13-19, 2020; Proceedings of the Conference on Computer Vision and Pattern Recognition, Oct. 2020, pp. 8110-8119.

Kim et al., "DiffusionCLIP: Text-Guided Diffusion Models for Robust Image Manipulation," Paper, Presented at the Computer Vision and Pattern Recognition, New Orleans, LA, Jun. 18-24, 2022; Proceedings of the Conference on Computer Vision and Pattern Recognition, Jan. 2023, pp. 2426-2435.

Kwon et al., "CLIPstyler: Image Style Transfer with a Single Text Condition," CoRR, Submitted on Dec. 1, 2021, arXiv:2112.00374v1, pp. 1-19.

Lee et al., "Countering language drift via visual grounding," Paper, Presented at the Conference on Empirical Methods in Natural Language Processing and the International Joint Conference on Natural Language Processing, Hong Kong, China, Nov. 3-7, 2019; Proceedings of the Conference on Empirical Methods in Natural Language Processing and the International Joint Conference on Natural Language Processing, Nov. 2019, pp. 4385-4395.

Li et al., "Controllable Text-to-Image Generation," Paper, Presented at the 33rd Conference on Neural Information Processing Systems, Vancouver, Canada, Dec. 8-14, 2019; Advances in Neural Information Processing Systems 32, Jun. 2020, pp. 1-11.

Li et al., "Object-driven Text-to-Image Synthesis via Adversarial Training," Paper, Presented at the conference on computer vision and pattern recognition, Long Beach, CA, Jun. 15-20, 2019; Proceedings of the Conference on Computer Vision and Pattern Recognition, Feb. 2020, pp. 12174-12182.

Lu et al., "Countering language drift with seeded iterated learning," Paper, International Conference on Machine Learning, Virtual Conference, Jul. 12-18, 2020; Proceedings of the 37th International Conference on Machine Learning, 2020, PMLR 119:11 pages.

Lu et al., "Customizable Text-to-Image Modeling by Contrastive Learning on Adjustable Word-Visual Pairs," Paper, Presented at the

(56) References Cited

OTHER PUBLICATIONS

International Conference on Human-Computer Interaction, Virtual Event, Jun. 26-Jul. 1, 2022; LNAI, 2022, 13336:463-474.
Mokady et al., "Self-Distilled StyleGAN: Towards Generation from Internet Photos," Paper, Presented at the Special Interest Group on Computer Graphics and Interactive Techniques Conference, Vancouver, Canada, Aug. 7-11, 2022; Proceedings of the Special Interest Group on Computer Graphics and Interactive Techniques Conference, Jul. 24, 2022, pp. 1-9.
Nichol et al., "GLIDE: Towards Photorealistic Image Generation and Editing with Text-Guided Diffusion Models," CoRR, Submitted on Dec. 20, 2021, arXiv:2112.10741v1, 20 pages.
Nichol et al., "GLIDE: Towards Photorealistic Image Generation and Editing with Text-Guided Diffusion Models," CoRR, Submitted on Dec. 22, 2021, arXiv:2112.10741v2, 20 pages.
Patashnik et al., "StyleCLIP: Text-Driven Manipulation of StyleGAN Imagery," CoRR, Submitted on Mar. 31, 2021, arXiv:2103.17249v1, pp. 1-18.
Qiao et al., "Learn, imagine and create: Text-to-image generation from prior knowledge," Paper, Presented at the 33rd Conference on Neural Information Processing Systems, Vancouver, Canada, Dec. 8-14, 2019; Advances in Neural Information Processing Systems 32, Jun. 2020, pp. 1-11.
Qiao et al., "MirrorGAN: Learning Text-to-image Generation by Redescription," Presented at the conference on computer vision and pattern recognition, Long Beach, CA, Jun. 15-20, 2019; Proceedings of the Conference on Computer Vision and Pattern Recognition, Feb. 2020, pp. 1505-1514.
Radford et al., "Learning transferable visual models from natural language supervision," CoRR, Submitted on Feb. 26, 2021, arXiv:2103.00020v1, pp. 1-48.
Raffel et al., "Exploring the limits of transfer learning with a unified text-to-text transformer," Journal of Machine Learning Research, Jun. 2020, 21:140, 1-67.
Ramesh et al., "Hierarchical Text-Conditional Image Generation with CLIP Latents," CoRR, Submitted on Apr. 13, 2022, arXiv:2204.06125v1, pp. 1-27.
Ramesh et al., "Zero-shot text-to-image generation," Paper, Presented at the International Conference on Machine Learning, virtual event, Jul. 18-24, 2021; Proceedings of the International Conference on Machine Learning, 2021, PMLR 139:11 pages.
Rombach et al., "High-Resolution Image Synthesis with Latent Diffusion Models," CoRR, Submitted on Dec. 20, 2021, arXiv:2112.10752v1, pp. 1-45.
Rombach et al., "High-resolution image synthesis with latent diffusion models," Paper, Presented at the Computer Vision and Pattern Recognition, New Orleans, LA, Jun. 18-24, 2022; Proceedings of the Conference on Computer Vision and Pattern Recognition, Jan. 2023, pp. 10684-10695.
Ruiz et al., "DreamBooth: Fine Tuning Text-to-Image Diffusion Models for Subject-Driven Generation," CoRR, Submitted on Aug. 25, 2022, arXiv:2208.12242v1, pp. 1-21.
Saharia et al., "Photorealistic Text-to-Image Diffusion Models with Deep Language Understanding," CoRR, Submitted on May 23, 2022, arXiv:2205.11487v1, pp. 1-46.
Sohl-Dickstein et al., "Deep unsupervised learning using nonequilibrium thermodynamics," Paper, Presented at the 32nd International Conference on Machine Learning, Lille, France, Jul. 6-11, 2015; Journal of Machine Learning Research, Jul. 2015, 37:10 pages.
Song et al., "Denoising diffusion implicit models," Poster, Presented at the International Conference on Learning Representations, Virtual Event, Oct. 28-30, 2020, pp. 1-20.
Song et al., "Generative modeling by estimating gradients of the data distribution," Paper, Presented at the 33rd Conference on Neural Information Processing Systems, Vancouver, Canada, Dec. 8-14, 2019; Advances in Neural Information Processing Systems 32, Jun. 2020, pp. 1-13.
Tao et al., "DF-GAN: Deep Fusion Generative Adversarial Networks for Text-to-Image Synthesis," CoRR, Submitted on Aug. 13, 2020, arXiv:2008.05865v1, pp. 1-13.
Wang et al., "Text2Sketch: Learning Face Sketch from Facial Attribute Text," Paper, Presented at the International Conference on Image Processing, Athens, Greece, Oct. 7-10, 2018; Proceedings of the International Conference on Image Processing, Feb. 2019, pp. 669-673.
Xia et al., "TediGAN: Text-Guided Diverse Face Image Generation and Manipulation," Paper, Presented at the conference on computer vision and pattern recognition, Nashville, TN, Jun. 20-25, 2021; Proceedings of the conference on computer vision and pattern recognition, Dec. 2021, pp. 2256-2265.
Yu et al., "Scaling Autoregressive Models for Content-Rich Text-to-Image Generation," CoRR, Submitted on Jun. 22, 2022, arXiv:2206.10789v1, pp. 1-49.
Zhang et al., "Photographic Text-to-Image Synthesis with a Hierarchically-nested Adversarial Network," Paper, Presented at the Conference on Computer Vision and Pattern Recognition, Salt Lake City, UT, Jun. 18-23, 2018; Proceedings of the Conference on Computer Vision and Pattern Recognition, Feb. 2019, pp. 6199-6208.
International Preliminary Report on Patentability in International Appln. No. PCT/US2023/030938, mailed on Mar. 6, 2025, 12 pages.
Office Action issued in the European Appln. No. 23777069.8, mailed on Oct. 20, 2025, 8 pages.

* cited by examiner

PERSONALIZED TEXT-TO-IMAGE DIFFUSION MODEL

CROSS REFERENCE TO RELATED APPLICATIONS

This application is a National Stage Application under 35 U.S.C. § 371 and claims the benefit of International Application No. PCT/US2023/030938, filed Aug. 23, 2023, which claims priority to U.S. Provisional Patent Application No. 63/400,368, filed on Aug. 23, 2022, the entire contents of which are hereby incorporated by reference.

BACKGROUND

This specification relates to processing images using neural networks.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that trains a text-to-image model to generate an image conditioned on a text input. The text input can include natural language text that specifies the content, e.g., an object, that should appear in the image.

In particular, the system trains the conditional text-to-image model so that the model generates images that each depict a variable instance of an object class when the object class without a unique identifier is provided as part of the text input, and generates images that each depict a same subject instance of the object class when the unique identifier is provided as part of the text input. Thus, it is possible to retrieve a specific subject instance from the model.

According to an aspect, there is provided, a computer-implemented method comprising: generating a custom image dataset from a plurality of images that each depict a subject instance, wherein generating the custom image dataset comprises: for each of the plurality of the images, determining an object class of the subject instance that is depicted in the image; determining, from a vocabulary of tokens and in accordance with predetermined frequencies of the tokens, a sequence of one or more tokens for the subject instance depicted in the plurality of images; and generating, from the sequence of one or more tokens, a unique identifier for the subject instance depicted in the plurality of images; and training a text-to-image model on the custom image dataset to adjust parameter values of the text-to-image model so that the text-to-image model generates images that each depict a variable instance of the object class when the object class without the unique identifier is provided as a text input, and that generates images that each depict the subject instance of the object class when the unique identifier is provided as the text input.

The custom image dataset may be a labeled image dataset. Training the text-to-image model may be further based upon additional images depicting variable images of the object class.

The vocabulary of tokens may be associated with a trained text processing neural network configured to process the tokens in the vocabulary, and wherein the predetermined frequency of each token in the vocabulary is determined from a corresponding number of times that the token has been processed by the text processing neural network during training.

The method may further comprise determining the sequence of one or more tokens by using the vocabulary of tokens and in accordance with the predetermined frequencies of the tokens comprises selecting tokens with the lowest frequencies in the vocabulary.

Determining the sequence of one or more tokens may comprise selecting different tokens for different subject instances.

Generating the unique identifier may comprise processing the sequence of one or more tokens using a text de-tokenizer to generate a string of Unicode characters.

Determining the object class of the subject instance that is depicted in the image may comprise processing the image using an object detector machine learning model to generate an object detection output that specifies the object class.

Each of the plurality of images in the custom image dataset may be associated with a respective label that comprises the unique identifier and text defining the object class.

The text-to-image model may be a diffusion model that is configured to generate an image that shows a particular subject instance from noise conditioned on an input specifying a unique identifier for the particular subject instance that should appear in the image.

The diffusion model may comprise a cascade of a low-resolution diffusion model and a super-resolution diffusion model.

Training the text-to-image model on the custom image dataset may comprise: processing a first training model input by using an instance of the text-to-image model in accordance with pre-trained parameter values to generate a first training output image, wherein the first training model input comprises noise and a conditioning vector specifying an object class; processing a second training model input by using the text-to-image model in accordance with current parameter values of the text-to-image model to generate a second training output image, wherein the second training model input comprises noise and the conditioning vector specifying the object class; processing a third training model input by using the text-to-image model in accordance with the current parameter values of the text-to-image model to generate a third training output image, wherein the third training model input comprises noise and a conditioning vector specifying the object class and the unique identifier; and determining an update to the current parameter values of the text-to-image model from a gradient of an objective function that includes a class-specific prior preservation loss term that measures a difference between the first training output image and the second training output image. The objective function may also include a reconstruction loss term that measures a difference between the third training output image and one of the plurality of images included in the custom image dataset.

Training the text-to-image model on the custom or labeled image dataset may comprise processing a first training model input that comprises noise and an embedding vector specifying an object class using the text-to-image model to generate a first training output image; generating a noisy version of the first training output image from the first training output image; processing a second training model input that comprises the noisy version of first training output image and the embedding vector specifying the object class using the text-to-image model to generate a second training output image; and determining an update to the parameter values of the text-to-image model from a gradient of an objective function that includes a class-specific prior preservation loss term that measures a difference between the first training output image and the second training output image. The objective function may also include a reconstruction loss term that encourages the text-to-image model to process a third training model input comprising a noisy version of a third training input image to generate training model outputs from which a similar image to the third training input image can be generated.

Generating the first training output image may comprise sampling from a training model output generated by the text-to-image model from the first training model input.

Sampling from the training model output may comprise using an ancestral sampler.

Training the text-to-image model may comprise training the low-resolution diffusion model and the super-resolution diffusion model on different training model inputs.

According to another aspect, there is provided a system comprising one or more computers and one or more storage devices storing instructions that are operable, when executed by the one or more computers, to cause the one or more computers to perform the operations of the above method aspect.

According to further aspect, there is provided a computer storage medium encoded with instructions that, when executed by one or more computers, cause the one or more computers to perform the operations of the above method aspects.

It will be appreciated that features disclosed in the context of one aspect may be combined with features disclosed in the context of one or more other aspects.

Particular embodiments of the subject matter described in this specification can be implemented so as to realize one or more of the following advantages. By automatically generating unique identifiers for different subject instances belonging to one or more object classes that appear in the images, some techniques described in this specification increase the value of image data that is currently available or otherwise easily obtainable when applied to train a text-to-image model configured to generate images according to text instructions or prompts. Some techniques described in this specification train the text-to-image model by optimizing both a reconstruction loss and a prior preserving loss, which alleviates issues caused by language drift, to generate higher quality (e.g., higher fidelity) images than those produced by existing models, while additionally enabling the text-to-image model to generate these images with a diverse range of various contexts, poses, views, and/or lighting conditions.

The described techniques enable a variety of technological use cases that were previously not possible. For example, a text-to-image model trained using the described techniques can be used to perform a range of image processing tasks ranging from generating realistic recontextualized images according to user instructions, and producing artistic renditions of different objects or scenes, to customizing and/or accessorizing existing objects depicted in the images.

The generating to the unique identifier for the instance of the object class can be realized by a small training set, e.g., 3, 5, or 10 images, and thus the system can catalog a large library of unique instances while requiring relatively fewer processing resources than would be required to determine unique instances from a large data set that includes many different instances. Additionally, the use of rare tokens in the unique identifier reduces the likelihood of semantic entanglement. Thus, fewer tokens are required for the identifier, which results in a more compact storage requirement, and fewer processing cycles to generate the unique token than would be required were more frequent tokens used, as use of the latter would require a larger token space to reduce the likelihood of semantic entanglement.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
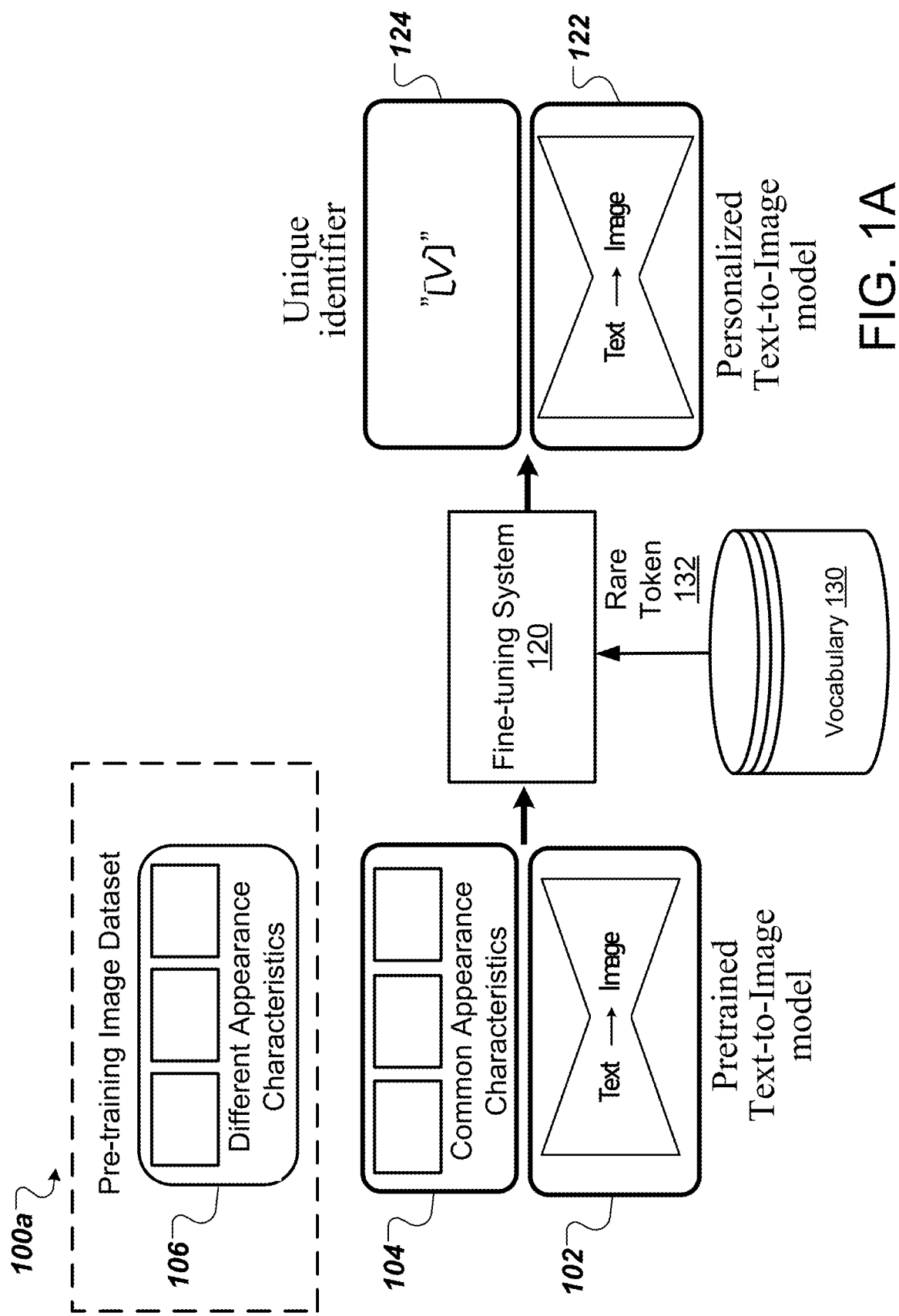
FIG. 1A is a diagram that illustrates an example architecture for fine-tuning a text-to-image model.
Figure 1B:
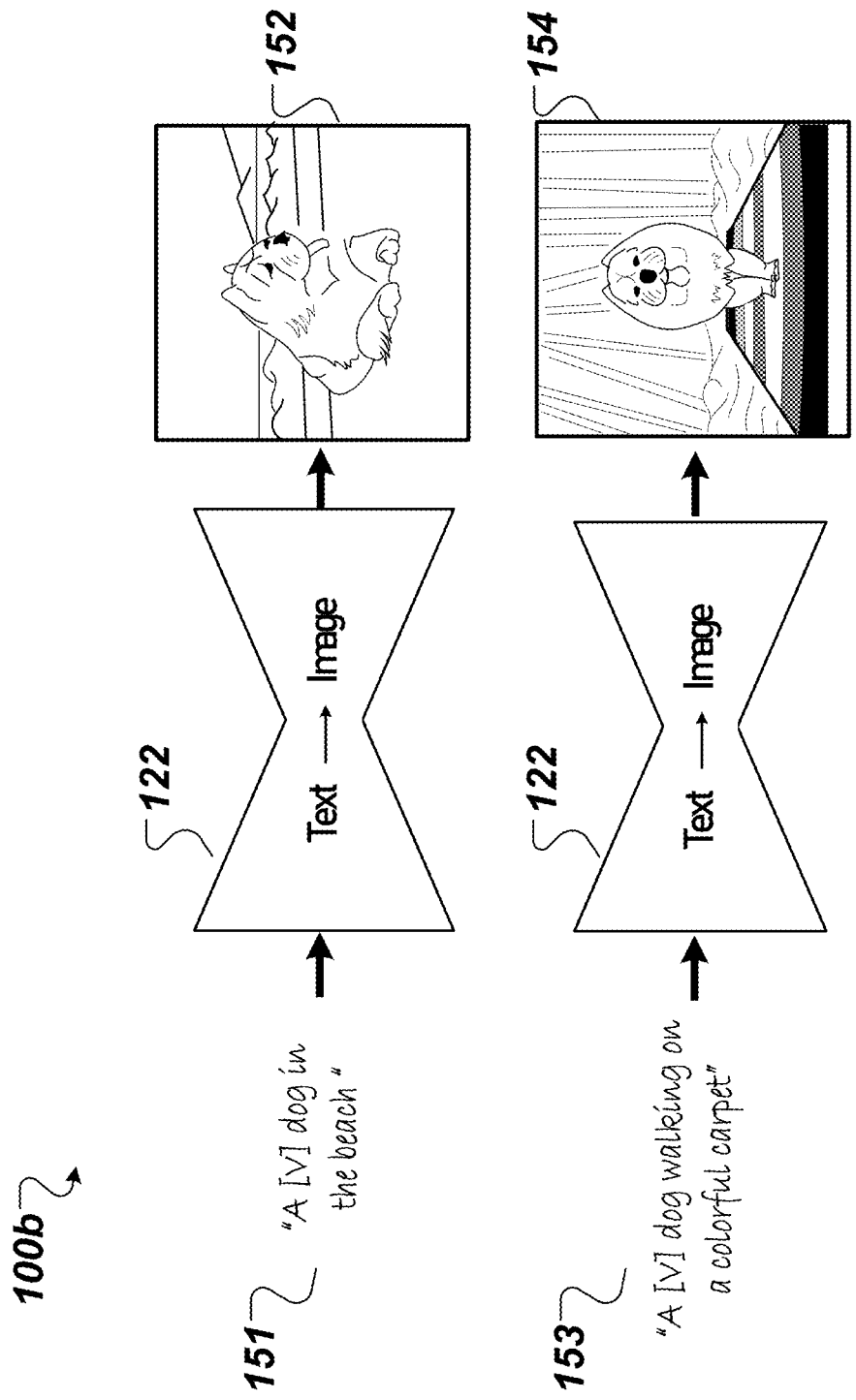
FIG. 1B is a diagram that illustrates an example architecture for performing inference using a fine-tuned text-to-image model.

FIGS. 1A and 1B respectively illustrate example architectures for fine-tuning and performing inference using a text-to-image model. The examples in this specification generally discuss using a diffusion neural network architecture to implement the text-to-image model. However, the same techniques can also be applied to any other appropriate neural image-generation model, e.g., a model implemented using a generative adversarial network (GAN) architecture, a variational autoencoder (VAE) architecture, or an autoregressive architecture.

FIG. 1A is a diagram that illustrates an example architecture 100a for fine-tuning a text-to-image model 102. The architecture 100a includes a fine-tuning system 120. The components of the fine-tuning system 120 can be implemented by a computing system comprising one or more computers that coordinate to fine-tune the text-to-image model 102.

Because the fine-tuning process need only utilize a relatively small number of images, this process may be referred to as "few-shot personalization." Therefore, while in some cases, the computing system can be a distributed computing system comprising a plurality of computers, in other cases, the computing system can include much less computationally expensive hardware, e.g., a desktop computer, laptop computer, or mobile computing device.

The text-to-image model 102 is a diffusion neural network that has parameters and that is configured to generate an output image by executing a reverse diffusion process over multiple time steps. At each time step, the text-to-image model 102 is configured to process a current intermediate (e.g., noisy) representation of the image in accordance with the values of the parameters to generate a noise output and use the noise output to update (e.g., de-noise) the current intermediate representation to generate an updated (e.g., de-noised) intermediate representation.

The noise output can, for example, include a noise estimate for each pixel in the intermediate representation of the image. For the very first time step, the intermediate representation that is provided as input to the text-to-image model 102 can be a randomly initialized noise input, for example, one that includes intensity values for the pixels in the image that are sampled from a noise distribution (e.g., a Gaussian distribution).

For example, the text-to-image model 102 generates a prediction of the output image using the current intermediate representation and the noise output. The text-to-image model 102 then updates the current intermediate representation by applying a diffusion sampler. e.g., a Denoising Diffusion Implicit Models (DDIM) sampler or a stochastic ancestral sampler, to sample from the prediction of the output image.

By way of illustration and not limitation, the text-to-image model 102 can be implemented using one of the example diffusion architectures described in Jonathan Ho, et al. *Denoising Diffusion Probabilistic Models*. arXiv: 2006.11239, 2020, Chitwan Saharia, et al., *Photorealistic text-to-image diffusion models with deep language understanding*. arXiv preprint arXiv:2205.11487, 2022, and Robin Rombach, et al., *High-resolution image synthesis with latent diffusion models*, in Proceedings of the IEEE/CVF Conference on Computer Vision and Pattern Recognition, 2022, pp. 10 684-10 695, to name just a few examples.

The text-to-image model 102 is pre-trained, that is, the parameter values of the text-to-image model 102 have been adjusted to improve the performance of the model in generating images conditioned on text inputs. The pre-training involves applying an appropriate diffusion pre-training procedure to the images included in a pre-training image dataset 106. In some cases, the pre-training is locally performed at the fine-tuning system 120 while in other cases, the pre-training is performed on a remote, distributed computing system having multiple computers.

The fine-tuning system 120 obtains the custom image dataset 104 and fine-tunes the pre-trained text-to-image model 102 on the obtained custom image dataset 104. The custom image dataset 104 includes a plurality of images that each depict a same particular subject instance of an object class. On the other hand, the pre-training image dataset 106 includes a plurality of images that each depict a different subject instance of the same object class, or a different subject instance of a different object class.

The object class may be any of a variety of classes (or types or categories) of objects including landmarks, landscape or location features, vehicles, tools, food, clothing, devices, animals, human, to name just a few examples.

There might be multiple subject instances that belong to a common object class. For any object class, each subject instance belonging to the object class may have a set of appearance characteristics that visually distinguish it from other subject instances that also belong to the same object class. In other words, different subject instances might appear differently than each other, although they all belong to the same object class.

For example, different subject instances (different vehicles) of a "vehicles" object class have different shapes, sizes and/or colors, and a particular vehicle may have a particular shape, a particular size, and/or a particular color that visually distinguish it from other vehicles that belong to the same "vehicles" object class.

As another example, different subject instances (different human faces) of a "human faces" object class have different facial characteristics, and a particular vehicle may have a particular set of facial characteristics that visually distinguish it from other human faces that belong to the same "human faces" object class. In this example, the facial characteristics may include, but are not limited to, a general shape and size of the face, a position of facial features (e.g., eyes, nose, mouth, or ears), and/or a shape of the facial features.

As yet another example, different subject instances (different Golden Retriever dogs) of a "Golden Retriever dogs" object class have different skin/fur colors, ear shapes, and/or sizes, and a particular Golden Retriever dog may have a particular skin/fur color, a particular ear shape, and/or a particular size that visually distinguish it from other Golden Retriever dogs that belong to the same "Golden Retriever dogs" object class.

Therefore, the object instances depicted in the plurality of images included in the custom image dataset 104 may share a common set of appearance characteristics. On the other hand, the object instances depicted in the plurality of images included in the pre-training image dataset 106 may have different appearance characteristics than each other.

Generally the custom image dataset 104 has a smaller, and usually much smaller, size than the pre-training image dataset 106. In some cases, the custom image dataset 104 includes no more than 10 images, e.g., 3-5 images, that each depict the particular subject instance, while the pre-training image dataset 106 includes 100 million, 100 billion, or more images that depict different subject instances (that belong to the same or different object classes).

The fine-tuning system 120 can obtain the custom image dataset 104 in any of a variety of ways. For example, the system can receive the images as an upload from a remote user of the system over a data communication network, e.g., using an application programming interface (API) made available by the system. As another example, the system can receive an input from a user specifying which images that are already maintained by the system or another system that is accessible by the system should be used for fine-tuning the text-to-image model 102.

The custom image dataset 104 can include labeled images. A labeled image is an image for which known label information, which defines or otherwise identifies the object class of the object instance that appears in the image, is available to the fine-tuning system 120.

In some cases, the images are labeled at the time they are received, e.g., the fine-tuning system 120 also receives, from the user who provided the images, data defining the object class of instances that appear in the images, while in other cases, the images are unlabeled at the time they are received. An unlabeled image is an image for which label information about a known object class of the object instance that appears in the image is not readily available to the system. In those other cases, prior to using the received images to fine-tune the text-to-image mode 102, the fine-tuning system 120 first uses a trained machine learning model, e.g., an object detection or image classification machine learning model, to process the obtained images to determine the object class of the subject instances that appear in the images.

As a part of the fine-tuning process, the fine-tuning system 120 generates a unique identifier 124 for the particular subject instance that appears in each of the images included in the custom image dataset 104. To do this, fine-tuning system 120 performs a rare token lookup in a vocabulary 130. The vocabulary 130 can be the vocabulary used by any of a variety of text processing neural networks, or multi-modal neural networks (e.g., one that processes both text and image data), when processing text.

By way of illustration and not limitation, the text processing neural network can be a Transformer-based language model neural network, which auto-regressively generates an output sequence of tokens by, for each particular position within the output sequence, selecting a token from the vocabulary using a computed score distribution that assigns a respective score to each token in the vocabulary of tokens.

The vocabulary 130 can include any of a variety of tokens that represent text symbols or other symbols. For example, the vocabulary 130 can include one or more of characters, sub-words, words, punctuation marks, numbers, or other symbols that appear in a corpus of natural language text.

Each token in the vocabulary 130 may have a predetermined frequency that is determined from a corresponding number of times that the token has been processed, e.g., received as input or generated as output or both, by the text processing neural network during training, and/or after training, i.e., at inference. Put another way, the predetermined frequency of each token represents a level of usage of the token (e.g., relative to other tokens in the vocabulary 130) by the text processing neural network over some period of time; the lower the frequency, the higher the rarity of a corresponding token in the vocabulary 130.

To generate the unique identifier 124 for the particular subject instance depicted in the images included in the custom image dataset 104, the fine-tuning system 120 selects one or more tokens from the vocabulary 130 in accordance with the predetermined frequencies. In selecting the one or more tokens, the fine-tuning system 120 prioritizes the selection of tokens having relatively lower frequencies- or, higher rarities (in terms of usage)-relative to other tokens in the vocabulary 130. In some implementations, the fine-tuning system 120 selects tokens with the lowest frequencies in the vocabulary 130, referred to as "rare tokens" 132 in FIG. 1A, for the particular subject instance.

The fine-tuning system 120 applies a de-tokenizer to map the selected rare tokens 132 to a string of characters. The string of characters is then used as the unique identifier 124 for the particular subject instance. For example, the string of characters can be represented as Unicode characters, ASCII characters, or characters in another text encoding format; and the de-tokenizer can be one that is used by the text processing neural network when generating text output. In some implementation, the fine-tuning system 120 provides the unique identifier 124 to a user of the system, e.g., the user who uploaded the custom image dataset 104.

After obtaining the unique identifier 124 in this way, the fine-tuning system 120 proceeds to fine-tune the text-to-image model 102 to generate a personalized text-to-image model 122, i.e., to determine fine-tuned values of the parameter of the text-to-image model from their pre-trained values, by using the unique identifier 124 and the obtained custom image dataset 104.

During fine-tuning, the fine-tuning system 120 optimizes a reconstruction loss when a text input which includes the unique identifier 124 is provided as input to the text-to-image model 102; and optimizes a class-specific prior preservation loss when a text input which does not include the unique identifier 124 is provided as input to the text-to-image model 102.

The fine-tuning process will be described in more details further below with reference to FIGS. 3-4, but in short, the personalized text-to-image model 122 generated as a result of the fine-tuning process learns a mapping from the unique identifier to images included in the custom image dataset 104, and, therefore, a mapping from the unique identifier 124 to the particular subject instance that appears in each of the images.

Once the training is complete, the fine-tuning system 120 can provide data specifying the personalized text-to-image model 122, i.e., data specifying the fine-tuned parameter values and, in some cases, the architecture of the text-to-image model, for deployment for performing the conditional image generation task, i.e., performing inference, on another system. Alternatively or in addition, the fine-tuning system 120 can deploy the personalized text-to-image model 122 and use the model to generate new images according to text prompts submitted by users.

FIG. 1B is a diagram that illustrates an example architecture 100b for performing inference using a fine-tuned text-to-image model. The architecture 100b includes a personalized text-to-image model 122 whose parameters have been adjusted according to the fine-tuning process. The personalized text-to-image model is a diffusion model that can generate new images that each show a particular subject instance from noise, conditioned on new input texts that each specify a unique identifier for the particular subject instance that should appear in the image.

Any of a variety of new text inputs may be received, e.g., from one or more remote users. For example, FIG. 1B illustrates two new text inputs 151, 153 that are each in the form of:

"a [V] [object class name] [context description]", where the object class name is "dog"; the context description is "in the beach" in text input 151, and is "walking on a colorful carpet" in text input 153; and [V] represents the unique identifier that has been generated for the particular subject instance that appears in each of the images included in a custom image dataset, e.g., the custom image dataset 104 of FIG. 1A, that was used during the fine-tuning process.

Note that the text inputs need not actually include delimiters "[" and "]". Also note that in other examples, the new text inputs can take different forms. In principle, the new text inputs can include any prompt text in any language that describes the desired content, e.g., a desired object, that should appear in the images.

In particular, however, in the example of FIG. 1B and any other examples, each new text input includes the same unique identifier [V]. When the unique identifier [V] is included as a part of a new text input, by virtue of the mapping from the unique identifier to the particular subject instance that has been learned as a result of the fine-tuning process, the personalized text-to-image model 122 is capable of processing the new text input to generate new images 152, 154 that each depict the particular subject instance of the object class identified by the unique identifier.

FIG. 1B therefore illustrates that the personalized text-to-image model 122 generates two new images 152, 154 that both show a particular dog that have the same skin/fur color, the same ear shape, and the same size, but in different backgrounds. The two new images 152, 154 can then be provided as output, e.g., to the one or more remote users that gave the new text inputs.

On the other hand, assuming the unique identifier [V] was not included in the new text inputs, e.g., the new text inputs is in the form of "a [object class name] [context description]", where the object class name is "dog"; corresponding images generated by the personalized text-to-image model 122 will show variable dogs that have different skin/fur colors, different ear shapes, and different sizes, as well as in different backgrounds, e.g., dependent on the actual context description specified in the prompt text.

This model configuration enables a variety of technological use cases that were previously not possible. For example, an image synthesis system that implements the personalized text-to-image model 122 can receive, e.g., from a user, a text prompt that includes a unique identifier defining the subject instance of interest (e.g., a particular person, a particular animal, a particular car, a particular boat, etc.), and use the model to generate an arbitrary number of high-fidelity synthetic images (e.g., photorealistic images) that each show a subject instance of interest with a diverse range of various contexts, poses, views, and/or lighting conditions. Thus, the system may receive a text prompt that includes a unique identifier defining the subject instance of interest and in response, generates an image depicting the subject instance using the text-to-image model.

More succinctly, an input to the text-to-image model 122 is generated, and includes a unique identifier that is generated from a sequence of one or more tokens that each have a predetermined frequency within a vocabulary and that each are selected based on having low frequencies relative to other tokens in the vocabulary. This reduces semantic entanglement. Then, the text input is provided to the text-to-image model 122. Because the text-to-image model 122 has been trained on a plurality of images that depict subject instances of object classes, and each of the particular instances is associated with a particular unique identifier, the model 122 can generate images that depict a particular subject instance when the unique identifier is received as a part of a text input. The model 122 then generates one or more images using the trained text-to-image model based on the text input, and each of the one or more images generated includes a depiction of the subject instance. The images are then provided as output.

Figure 2:
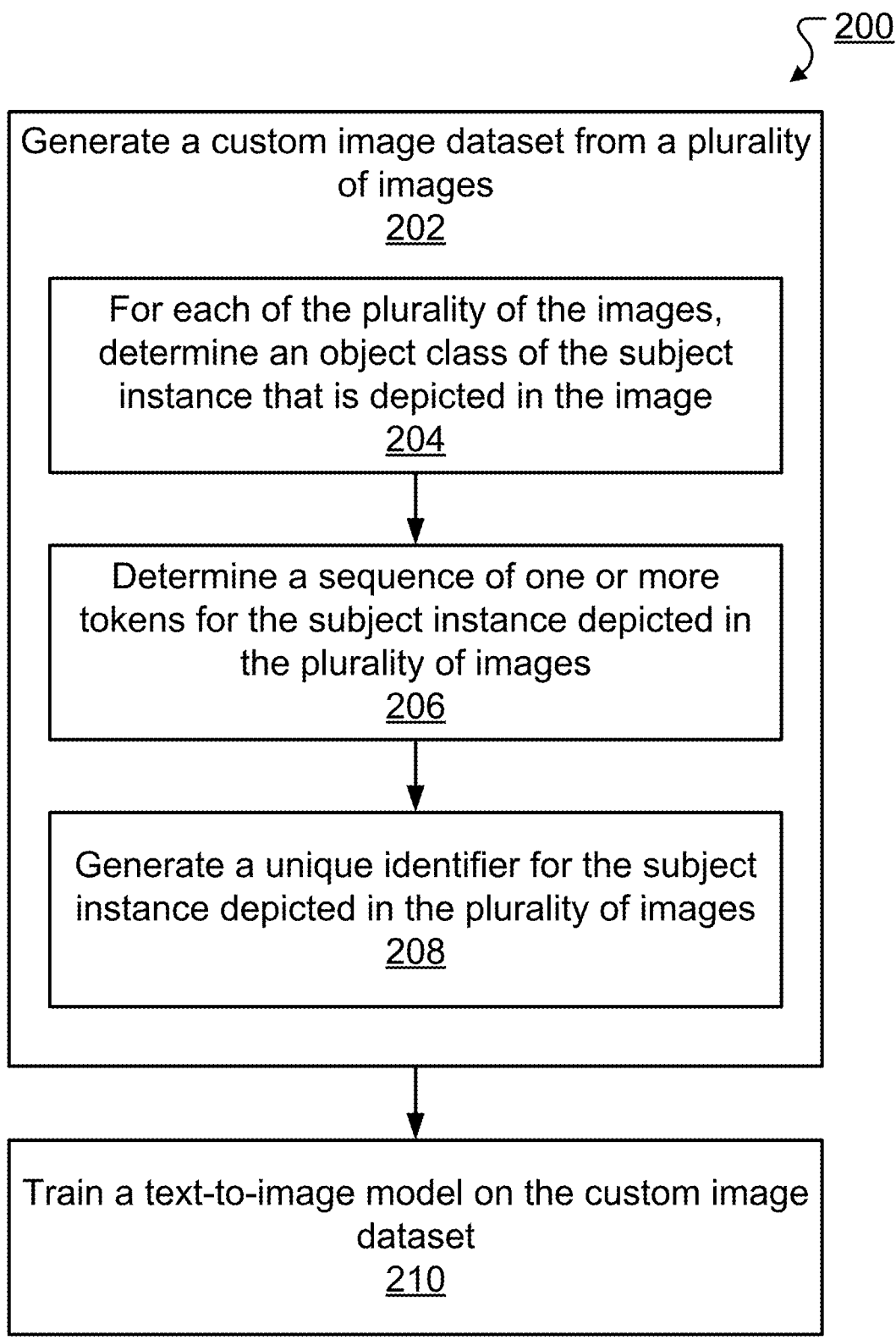
FIG. 2 is a flowchart of an example process for fine-tuning a text-to-image model.

FIG. 2 is a flow diagram of an example process 200 for fine-tuning a text-to-image model for generating images depicting a particular subject instance of interest. For convenience, the process 200 will be described as being performed by a system of one or more computers located in one or more locations. For example, a training system, e.g., the fine-tuning system 120 depicted in FIG. 1A, appropriately programmed in accordance with this specification, can perform the process 200.

The system generates a custom image dataset from a plurality of images that each depict a same particular subject instance (step 202). For example, the plurality of images can be received by the system as an upload. e.g., from a remote user of the system, or from another source that is accessible by the system. As discussed above, depicting the same particular subject instance means that, the plurality of images included in the custom image dataset each depict a subject instance that share a common set of appearance characteristics as the subject instances depicted in other images included in the custom image dataset.

In general, the system generates the custom image dataset by associating each of the plurality of images with (i) a respective label that includes a unique identifier, which identifies the particular subject instance that appears in the image, and (ii) text that defines the object class to which the particular subject instance belongs. Generating the custom image dataset can involve perform the followings steps 204-208.

The system determines, for each of the plurality of the images, an object class of the particular subject instance that is depicted in the image (step 204). In some cases, the images are labeled at the time they are received; thus, the system can determine the object class based on the received label information. In some other cases, the images are unlabeled at the time they are received; thus, the system can use a trained machine learning model, e.g., an object detection or image classification machine learning model, to process each received image to generate an object detection output that specifies the object class of the particular subject instance that appears in the received image.

The system determines, from a vocabulary of tokens and in accordance with the predetermined frequencies of the tokens included in the vocabulary, a sequence of one or more tokens for the particular subject instance depicted in the plurality of images (step 206). Typically, the system selects different tokens for different subject instances.

For each subject instance, in selecting each of the one or more tokens in the corresponding sequence, the system prioritizes the selection of tokens having relatively lower frequencies—or, higher rarities in terms of usage—relative to other tokens in the vocabulary. In some implementations, the system can select tokens with the lowest frequencies in the vocabulary for a particular subject instance. For example, the system can select, as a first token in the sequence, a rare token that has the lowest frequency from the vocabulary of tokens, and then select, as a second token in the sequence, another rare token that has the second lowest frequency from the vocabulary of tokens, and so on.

The system processes the sequence of one or more tokens using a text de-tokenizer to generate the unique identifier (step 208). The unique identifier, which identifies the particular subject instance depicted in the plurality of images, can be represented as a string of characters in a given text encoding format, e.g., a Unicode format, an ASCII format, or another text encoding format.

The system trains a text-to-image model on the custom image dataset to adjust parameter values of the text-to-image model (step 210). In particular, the system trains the text-to-image model so that the text-to-image model generates images that each depict a variable instance of the object class when the object class without the unique identifier is provided as a text input, and that generates images that each depict the particular subject instance of the object class when the unique identifier is provided as the text input. Step 210 is described in more detail below.

Figure 3:
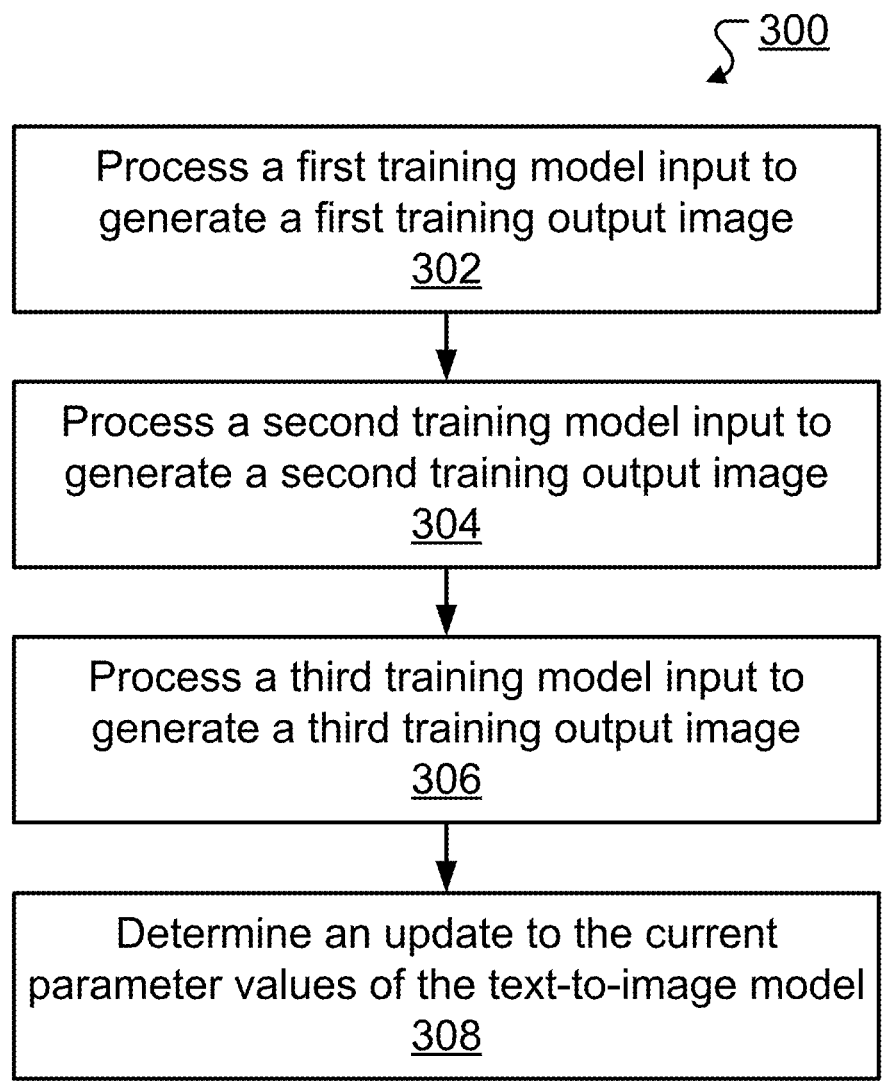
FIG. 3 is a flow diagram of an example process for determining an update based on an objective function that includes a class-specific prior preservation loss.

FIG. 3 is a flow diagram of an example process 300 for determining an update based on an objective function that includes a class-specific prior preservation loss. For convenience, the process 300 will be described as being performed by a system of one or more computers located in one or more locations. For example, a training system, e.g., the fine-tuning system 120 depicted in FIG. 1A, appropriately programmed in accordance with this specification, can perform the process 300.

The system can repeatedly perform multiple iterations of process 300 to determine the fine-tuned values of the parameters of the text-to-image model from their pre-trained values. In general, the system can repeatedly perform the process 300 until a termination criterion is reached, e.g., after the process 300 have been performed a predetermined number of times.

The system processes a first training model input that includes (i) a first noise and (ii) a conditioning vector generated from text that specifies an object class, using a frozen instance of the text-to-image model that has pre-trained parameter values (that have been determined as a result of the pre-training) to generate a first training output image (step 302).

The noise can, for example, be a noise sampled from a noise distribution (e.g., a Gaussian distribution, such as N(0, I), where I is an identity matrix. The conditioning vector c=Γ(P) can be generated by using a text encoder neural network Γ from processing a text input P. The text input P includes text that specifies an object class and, in particular, that does not include the unique identifier.

The system processes a second training model input that includes (i) a second noise and (ii) the conditioning vector generated from text that specifies the object class, using the text-to-image model in accordance with current parameter values (that have been adjusted as a result of performing previous iterations of the process 300) to generate a second training output image (step 304). Like the conditioning vector used in step 302, the conditioning vector is generated from text that does not include the unique identifier.

The system processes a third training model input that includes (i) a third noise and (ii) a conditioning vector generated from text that specifies the object class and that includes the unique identifier, using the text-to-image model in accordance with the current parameter values (that have been adjusted as a result of performing previous iterations of the process 300) to generate a third training output image (step 306).

In other words, unlike the conditioning vectors used in steps 302 and 304, here the conditioning vector c=Γ(P) can be generated by using a text encoder neural network Γ from processing a text input P which includes both (i) text that specifies an object class and (ii) a unique identifier which identifies the particular subject instance depicted in the plurality of images included in the custom image dataset.

The system determines an update to the current parameter values of the text-to-image model from a gradient of an objective function (step 308). Specifically, the system computes the gradient with respect to the parameters of the text-to-image model and applies an optimizer to the gradients to generate a gradient-based update to the current parameter values of the text-to-image model.

The objective function includes both a reconstruction loss term and a class-specific prior preservation loss term. The reconstruction loss term trains the text-to-image model to generate training output images that are similar to those images included in the custom image dataset. To that end, the reconstruction loss term can measure a difference between the third training output image and one of the plurality of images included in the custom image dataset. For example, the difference can be computed as a squared distance between the third training output image and an image selected from the custom image dataset:

$$[w_t \|\hat{x}_\theta(\alpha_t x + \sigma_t \epsilon, c) - x\|_2^2],$$

where θ represents the parameters of the text-to-image model, x is an image selected from the custom image dataset, $\epsilon \sim N(0, I)$ is the initial noise input, c is a conditioning vector (that is generated from text including the unique identifier), and $\alpha_t$, $\sigma_t$, $\omega_t$ are terms that control the noise schedule and sample quality, and are functions of the diffusion process time $t \sim U([0, 1])$.

On the other hand, the class-specific prior preservation loss term trains the text-to-image model to generate training output images similar to the training output images that are generated by the frozen instance of the text-to-image model. Unlike the images included in the custom image dataset which all depict the same particular subject instance of an object class, these training output images could each depict a different subject instance (that belongs to the same or different object classes).

The frozen instance of the text-to-image model has pre-trained parameter values that are held fixed after the pre-training, and, hence, are at least partially different from the current parameter values of the text-to-image model, which have been adjusted during the fine-tuning process. The class-specific prior preservation loss term can measure a difference, e.g., that is computed as a squared distance, between the first training output image and the second training output image.

$$w_{t'} \|\hat{x}_\theta(\alpha_{t'} x_{pr} + \sigma_{t'} \epsilon', c_{pr}) - x_{pr}\|_2^2],$$

where θ represents the parameters of the text-to-image model, $x_{pr} = \hat{x}(z_{t1}, c_{pr})$ is an image generated by using the ancestral sampler on the frozen instance of the pre-trained text-to-image model, $\epsilon' \sim N(0, I)$ is the initial noise input, $c_{pr}$ is a conditioning vector (that is generated from text without the unique identifier), and $\alpha_t$, $\sigma_t$, $\omega_t$ are terms that control the noise schedule and sample quality, and are functions of the diffusion process time $t \sim U([0, 1])$.

Figure 4:
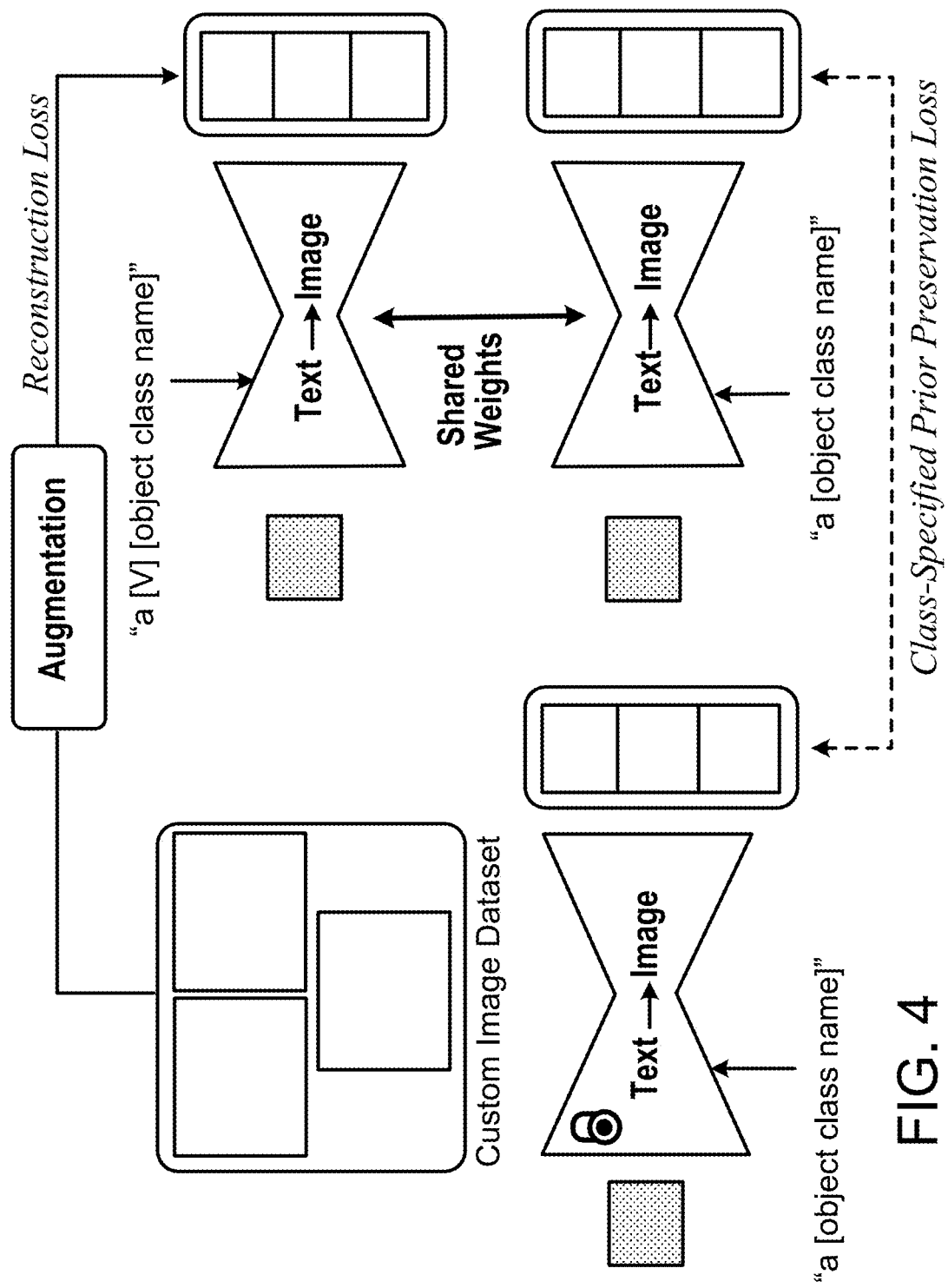
FIG. 4 is a diagram that illustrates an example process for fine-tuning a text-to-image model.

FIG. 4 is a diagram 400 that illustrates an example process for fine-tuning a text-to-image model. As illustrated, the fine-tuning process of the text-to-image model makes use of both a reconstruction loss term and a class-specific prior preservation loss term. The system computes the reconstruction loss term with respect to images selected from the custom image dataset. Those images each depict a same particular subject instance. To compute the class-specific prior preservation loss term, the system additionally makes use of a frozen instance of the text-to-image model has pre-trained parameter values that are held fixed.

During training, the system can incorporate any number of techniques to improve the speed, the effectiveness, or both of the fine-tuning process. For example, some implementations of the text-to-image model can include a sequence (or "cascade") of a low-resolution diffusion model and a super-resolution diffusion model. By making use of a sequence of diffusion models that can each be conditioned on the text input, the system can iteratively up-scale the resolution of the image, ensuring that a high-resolution image can be generated without requiring a single model to generate the image at the desired output resolution directly. In these implementations, the system can train the low-resolution diffusion model and the super-resolution diffusion model on different training model inputs.

As another example, the system can make use of a noise conditioning augmentation technique, which involves corrupting the intermediate representations using noise with specific strength, and then conditioning (the super-resolution diffusion model of) the text-to-image model on the level of corruption. Noise conditioning augmentation is described in more details in Jonathan Ho, et al. *Cascaded diffusion models for high fidelity image generation*. J. Mach. Learn. Res., 23:47-1, 2022.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry. e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry, Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device. e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component. e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
   generating a custom image dataset from a plurality of images that each depict a subject instance, wherein generating the custom image dataset comprises:
      for each of the plurality of the images, determining an object class of the subject instance that is depicted in the image;
      determining, from a vocabulary of tokens and in accordance with predetermined frequencies of the tokens, a sequence of one or more tokens for the subject instance depicted in the plurality of images; and
      generating, from the sequence of one or more tokens, a unique identifier for the subject instance depicted in the plurality of images; and
   training a text-to-image model on the custom image dataset to adjust parameter values of the text-to-image model so that the text-to-image model generates images that each depict the subject instance of the object class when the unique identifier is provided as the text input, wherein training the text-to-image model on the custom image dataset comprises:
      processing a first training model input by using an instance of the text-to-image model in accordance with pre-trained parameter values to generate a first training output image, wherein the first training model input comprises noise and a conditioning input specifying the object class;
      processing a second training model input by using the text-to-image model in accordance with current parameter values of the text-to-image model to generate a second training output image, wherein the second training model input comprises noise and the conditioning input specifying the object class;
      processing a third training model input by using the text-to-image model in accordance with the current parameter values of the text-to-image model to generate a third training output image, wherein the third training model input comprises noise and a conditioning input specifying the object class and including the unique identifier; and
      determining an update to the current parameter values of the text-to-image model from a gradient of an objective function that includes a class-specific prior preservation loss term that measures a difference between the first training output image and the second training output image.

2. The method of claim 1, wherein training the text-to-image model comprises training the text-to-image model so that the text-to-image model generates images that each depict a variable instance of the object class when the object class without the unique identifier is provided as a text input.

3. The method of claim 1, wherein the vocabulary of tokens is associated with a trained text processing neural network configured to process the tokens in the vocabulary, and wherein the predetermined frequency of each token in the vocabulary is determined from a corresponding number of times that the token has been processed by the text processing neural network during training.

4. The method of claim 3, determining the sequence of one or more tokens by using the vocabulary of tokens and in accordance with the predetermined frequencies of the tokens comprises selecting tokens with the lowest frequencies in the vocabulary.

5. The method of claim 3, wherein determining the sequence of one or more tokens comprises selecting different tokens for different subject instances.

6. The method of claim 1, wherein generating the unique identifier comprises processing the sequence of one or more tokens using a text de-tokenizer to generate a string of Unicode characters.

7. The method of claim 1, wherein determining the object class of the subject instance that is depicted in the image comprises processing the image using an object detector machine learning model to generate an object detection output that specifies the object class.

8. The method of claim 1, wherein each of the plurality of images in the custom image dataset is associated with a respective label that comprises the unique identifier and text defining the object class.

9. The method of claim 1, wherein the text-to-image model is a diffusion model that is configured to generate an image that shows a particular subject instance from noise conditioned on an input specifying a unique identifier for the particular subject instance that should appear in the image.

10. The method of claim 9, wherein the diffusion model comprises a cascade of a low-resolution diffusion model and a super-resolution diffusion model.

11. The method of claim 1, wherein generating the first training output image comprises sampling from a training model output generated by the text-to-image model from the first training model input.

12. The method of claim 1, wherein sampling from the training model output comprises using an ancestral sampler.

13. The method of claim 1, wherein the objective function also includes a reconstruction loss term that measures a difference between the third training output image and one of the plurality of images included in the custom image dataset.

14. The method of claim 1, wherein:
the text-to-image model is a diffusion model comprising a cascade of a low-resolution diffusion model and a super-resolution diffusion model, and the diffusion model is configured to generate an image that shows a particular subject instance from noise conditioned on an input specifying a unique identifier for the particular subject instance that should appear in the image; and
training the text-to-image model comprises training the low-resolution diffusion model and the super-resolution diffusion model on different training model inputs.

15. A computer-implemented method comprising:
receiving a plurality of images, each of the plurality of images depicting a subject instance;
generating a unique identifier for the subject instance depicted in the plurality of images;
training a text-to-image model on the plurality of images that depict the subject instance to adjust parameter values of the text-to-image model so that the text-to-image model generates images that depict the subject instance when the unique identifier is received as a part of a text input, wherein training the text-to-image model on the plurality of images comprises:
processing a first training model input by using an instance of the text-to-image model in accordance with pre-trained parameter values to generate a first training output image, wherein the first training model input comprises noise and a conditioning input specifying an object class of the subject instance that is depicted in the plurality of images;
processing a second training model input by using the text-to-image model in accordance with current parameter values of the text-to-image model to generate a second training output image, wherein the second training model input comprises noise and the conditioning input specifying the object class;
processing a third training model input by using the text-to-image model in accordance with the current parameter values of the text-to-image model to generate a third training output image, wherein the third training model input comprises noise and a conditioning input specifying the object class and including the unique identifier; and
determining an update to the current parameter values of the text-to-image model from a gradient of an objective function that includes a class-specific prior preservation loss term that measures a difference between the first training output image and the second training output image;
receiving a text input that includes the unique identifier;
generating one or more images using the text-to-image model based on the text input, wherein each of the one more images includes a depiction of the subject instance; and
outputting the one or more images.

16. The method of claim 15, wherein the text-to-image model is a diffusion model.

17. A computer-implemented method comprising:
generating, as input to a text-to-image model, a text input that includes a unique identifier that is generated from a sequence of one or more tokens that each have a predetermined frequency within a vocabulary and that each are selected based on having a low frequency relative to other tokens in the vocabulary;
providing the text input to the text-to-image model, wherein the text-to-image model has been trained on a plurality of images that depict a particular subject instances that is associated with the unique identifier to generate images that depict the particular subject instance when the unique identifier is received as a part of a text input, wherein training the text-to-image model on the plurality of images comprises:
processing a first training model input by using an instance of the text-to-image model in accordance with pre-trained parameter values to generate a first training output image, wherein the first training model input comprises noise and a conditioning input specifying an object class of the particular subject instance that is depicted in the plurality of images;
processing a second training model input by using the text-to-image model in accordance with current parameter values of the text-to-image model to generate a second training output image, wherein the second training model input comprises noise and the conditioning input specifying the object class;

processing a third training model input by using the text-to-image model in accordance with the current parameter values of the text-to-image model to generate a third training output image, wherein the third training model input comprises noise and a conditioning input specifying the object class and including the unique identifier; and determining an update to the current parameter values of the text-to-image model from a gradient of an objective function that includes a class-specific prior preservation loss term that measures a difference between the first training output image and the second training output image;

generating one or more images using the text-to-image model based on the text input, wherein each of the one more images generated includes a depiction of the particular subject instance; and outputting the one or more images.

18. The method of claim 17, wherein the text-to-image model is a diffusion model.

19. A system comprising one or more computers and one or more storage devices storing instructions that are operable, when executed by the one or more computers, to cause the one or more computers to perform operations comprising:

generating a custom image dataset from a plurality of images that each depict a subject instance, wherein generating the custom image dataset comprises:

for each of the plurality of the images, determining an object class of the subject instance that is depicted in the image;

determining, from a vocabulary of tokens and in accordance with predetermined frequencies of the tokens, a sequence of one or more tokens for the subject instance depicted in the plurality of images; and generating, from the sequence of one or more tokens, a unique identifier for the subject instance depicted in the plurality of images; and training a text-to-image model on the custom image dataset to adjust parameter values of the text-to-image model so that the text-to-image model generates images that each depict the subject instance of the object class when the unique identifier is provided as the text input, wherein training the text-to-image model on the custom image dataset comprises:

processing a first training model input by using an instance of the text-to-image model in accordance with pre-trained parameter values to generate a first training output image, wherein the first training model input comprises noise and a conditioning input specifying the object class;

processing a second training model input by using the text-to-image model in accordance with current parameter values of the text-to-image model to generate a second training output image, wherein the second training model input comprises noise and the conditioning input specifying the object class;

processing a third training model input by using the text-to-image model in accordance with the current parameter values of the text-to-image model to generate a third training output image, wherein the third training model input comprises noise and a conditioning input specifying the object class and including the unique identifier; and determining an update to the current parameter values of the text-to-image model from a gradient of an objective function that includes a class-specific prior preservation loss term that measures a difference between the first training output image and the second training output image.

20. A non-transitory computer storage medium encoded with instructions that, when executed by one or more computers, cause the one or more computers to perform operations comprising:

generating a custom image dataset from a plurality of images that each depict a subject instance, wherein generating the custom image dataset comprises:

for each of the plurality of the images, determining an object class of the subject instance that is depicted in the image;

determining, from a vocabulary of tokens and in accordance with predetermined frequencies of the tokens, a sequence of one or more tokens for the subject instance depicted in the plurality of images; and generating, from the sequence of one or more tokens, a unique identifier for the subject instance depicted in the plurality of images; and training a text-to-image model on the custom image dataset to adjust parameter values of the text-to-image model so that the text-to-image model generates images that each depict the subject instance of the object class when the unique identifier is provided as the text input, wherein training the text-to-image model on the custom image dataset comprises:

processing a first training model input by using an instance of the text-to-image model in accordance with pre-trained parameter values to generate a first training output image, wherein the first training model input comprises noise and a conditioning input specifying the object class;

processing a second training model input by using the text-to-image model in accordance with current parameter values of the text-to-image model to generate a second training output image, wherein the second training model input comprises noise and the conditioning input specifying the object class;

processing a third training model input by using the text-to-image model in accordance with the current parameter values of the text-to-image model to generate a third training output image, wherein the third training model input comprises noise and a conditioning input specifying the object class and including the unique identifier; and determining an update to the current parameter values of the text-to-image model from a gradient of an objective function that includes a class-specific prior preservation loss term that measures a difference between the first training output image and the second training output image.

* * * * *